United States Patent [19]

Richardson et al.

[11] Patent Number: 5,325,624
[45] Date of Patent: Jul. 5, 1994

[54] ELECTRONIC FLY POPULATION CONTROL APPARATUS

[76] Inventors: R. H. Richardson, Rte. #1, Box 12A, Hayesville, N.C. 28904; Hank Beesley, 2991 Woodrow Way, Atlanta, Ga. 30319

[21] Appl. No.: 941,987

[22] Filed: Sep. 8, 1992

[51] Int. Cl.$^5$ .................................................. A01M 1/22
[52] U.S. Cl. ................................................................ 43/112
[58] Field of Search .................. 43/112, 98, 9.6, 17.1, 43/124, 113; 367/139

[56] References Cited

U.S. PATENT DOCUMENTS

| | | | |
|---|---|---|---|
| 2,647,228 | 7/1953 | Just | 43/112 |
| 2,917,863 | 12/1959 | Anderson et al. | 43/112 |
| 3,483,649 | 12/1969 | Klima et al. | 43/9.6 |
| 3,708,907 | 1/1973 | Cole | 43/112 |
| 4,387,529 | 6/1983 | Hedstrom | 43/112 |
| 4,471,561 | 9/1984 | Lapierre | 43/112 |
| 4,817,331 | 4/1989 | Podsiadly et al. | 43/1 |
| 4,949,500 | 8/1990 | Jefferys | 43/112 |

Primary Examiner—Paula A. Bradley
Assistant Examiner—Chuck Y. Mah

[57] ABSTRACT

A non-toxic, non-chemical, non-polluting, inexpensive electronic apparatus (10) which controls the fly population within an animal or poultry enclosure which kills by destroying the nervous system of the fly with a short pulse of a high voltage that is applied to a pair of conductors (80) and (81) every 1 to 5 seconds.

4 Claims, 5 Drawing Sheets

ELECTRONIC FLY POPULATION CONTROL APPARATUS

BACKGROUND—FIELD OF INVENTION

This invention relates to the control of fly populations, specifically to a non-toxic, non-chemical electronic means for reducing the fly population within an animal or poultry shelter.

BACKGROUND—DESCRIPTION OF PRIOR ART

One of the largest management problems facing livestock and poultry producers today is that of the control of the fly population within the animal shelters. Control of the fly population is becoming more important as human populations move further from the cities and closer to the farms. Complicating this problem is the increasingly strict Health Department and EPA regulations limiting the options of the farmer in the techniques and chemicals available to him. Typical management techniques have been to apply chemical baits or sprays to kill the files at various stages of their life cycle. These techniques are not only expensive to administer but also the chemicals are becoming more restricted and expensive as the environmental movement gains momentum. In addition to these society-imposed restrictions of the use of chemicals, the fly population becomes immune to these chemicals after prolonged (sometimes as little as 3 months) use.

It is obvious that what is needed is a non-toxic, non-chemical, non-polluting, inexpensive technique that will control the fly population and to which the population will not become immune. Electronic killing devices have been proposed as the answer to this problem. However, previous electronic methods used to control the fly population in animal and poultry buildings resulted in many unforseen and unsolveable (at the time) problems. An insect electrocution apparatus was disclosed in U.S. Pat. Nos. 2,821,806, Feb. 4, 1958 to Anderson and 2,917,863, Dec. 22, 1959 to Anderson Et al, and 2,912,787, Nov. 17, 1959 to Patridge. However, devices constructed in accordance with the teachings of these references frequently cause electrical arcs between the conductor wires. Larger insects and rodents caused continuous arcing which burned out the high voltage transformers employed in these devices in a short period of time. The conductor wires frequently were burnt apart by the frequent or continuous arcing. When burnt into, the loose wires caused further arcing to parts of the structure and frequently caused sparks that could and did ignite the building housing the apparatus.

U.S. Pat. No. 3,708,907, issued to J. B. Cole on Jan. 9, 1973 addressed some of the objections to the previous designs. However, the problems were not solved but only took longer to surface. A current limiter was inserted to limit the current during the arcing conditions and improve the reliability of the system. However, devices constructed as taught in this patent still exhibited the arcing problems and required that the transformer and the conductors be replaced every year or so. The potential for fire was also still present with devices constructed as taught in this patent.

The methods disclosed in the prior art are also expensive and the apparatus is very difficult and labor intensive to install and maintain.

Another disadvantage in the prior art methods surfaced when they were installed in horse barns. It was found that the noise generated when electrocuting insets was very stressful to the horses.

Another disadvantage found in the prior art is in the required spacing of the conductors. Because of the very high voltage (4–5 KVrms) needed to electrocute the flies, the conductors had to be maintained at a distance apart of ⅜" or more. Since an adult fly is approximately 3/16" long, this limited the number of flies killed.

A further disadvantage of the high voltage needed (4–5 KVrms or 12 KVp-p), is that any combustable material such as chicken feathers, dust, rodents, large insects, etc., could be ignited by the arcing. After fries were started in several poultry houses using the apparatus of the prior art, the entire technique fell into disrepute and no commercial applications have been addressed in over 20 years.

OBJECT AND ADVANTAGES

It is an object of this invention to improve the techniques employed, the apparatus disclosed and reduce the cost of the prior art disclosures and thus demonstrate a commercially attractive system using state-of-the art electronics. Accordingly, several objects and advantages of our invention are in the following paragraphs.

The main object of this invention is to provide a more effective and less costly apparatus for controlling the population of flies within an animal or poultry enclosure that is safe for humans, safe for the building and can be commercially exploited.

The prior art disclosures all stated that their intent was to kill the insect by electrocution or incineration. The technique we have developed is not to electrocute or incinerate the flies but rather to kill them be attacking and destroying their nervous system. To accompolish this we have developed a system that uses a pulse of approximately 6 KV peak-to-peak with approximately a 1 to 20 millisecond (msec) pulse width and a pulse repetition rate (prr) of approximately 1 pulse per second (1 pps) to 1 pulse per 5 seconds (0.2 pps). The amplitude, pulse width and pulse repetition rate is carefully selected so as to not contain enough average power to ignite any materials likely to be in the environment where the system is to be installed but contain sufficient energy in the pulse to kill the fly by damaging his nervous system.

This lower voltage and lower energy content in the pulse of our invention allows the conductors to be spaced as close as ⅛" without arcing. The nominal spacing has been determined to be 3/16" as this is the average length of an adult fly.

The prior art devices used a continuous or nearly continuous high voltage (4–5 KV rms) to electrocute or incinerate the insects. This voltage is greater than 12 KV peak-to-peak and thus requires a minimum conductor spacing of ⅜" whereas the adult fly is approximately 3/16" long. An advantage of the nominal 3/16" we have selected for the conductor spacing of our invention is that the fly can more easily contact both conductors and cause conduction of the small current during the pulse that is required to cause nervous system destruction.

Another object is to reduce the conductor to conductor and the conductor to structure arcing that caused so many problems with the prior art devices. An advantage of our pulsed voltage technique is that the average energy content of the pulses is too low to cause the type of failures and problems experienced with the prior art devices. This invention will not cause conductor failure nor do the pulses contain sufficient energy to cause ignition of materials normally present in the surrounding environment.

A further advantage of our invention is that neither of the two conductors are gounded. The low power pulse appears between the two conductors and is not referenced to ground. Thus, if a conductor inadvertently comes in contact with anything in the building, even a metal truss, there is not voltage differential to cause an arc. If a person contacts both conductors simultaneously, a brief local stinging sensation across the finger or area touching both conductors will be felt. This low level shock can cause no harm to humans or even to small animals or rodents. It's only lethal to flies and similar insects.

Another advantage of our invention is that the parallel conductors are not limited to straight runs but can be installed in any pattern desired as long as the spacing of greater than ⅛" between them is maintained.

A further advantage is that the conductors need not be mounted near the roof or a wall but can be mounted on the bottom side of the rafters in an open poultry house, beneath the open rafters of a holding shed in a dairy barn, between poles in a pole barn, etc.

Another object of this invention si to electronically kill the flies without creating a loud "zapping" noise as is created when an apparatus built to prior art designs is electrocuting and/or incinerating insects. The advantage of our invention is that it kills by destroying the nervous system and not by electrocuting or incinerating the fly. The small current that passes through the fly and causes death (usually in less than one minute) creates no loud arcing noises and therefore does not disturb horses when installed in a horse barn.

Another object of our invention is to reduce the problem of insects sticking to parts of the apparatus and causing a shorted condition as occurrs with devices constructed to the teachings of the prior art. An advantage of our invention is that dead or dying flies can literally cover the conductors and insulators and cause no operational problems. We have discovered that flies prefer a bare stranded wire conductor of about 1/16" diameter for roosting but appear to be equally attracted to the conductors when dead flies are hanging on the conductors. The destructive capability of the invention is not reduced when a fly lands on dead bodies from that of landing on the bare conductor.

Another object of this invention is to reduce the cost of the system components and the cost of installing the system. Previous disclosures have required the installation of multiple conductors. An advantage of this invention is that it requires only two conductors. This has reduced the system component cost and the cost of installation. Another advantage is that the installation of a system per our invention is much simpler than previously disclosed in the prior art and requires considerably less time.

An object of our invention is to reduce the component cost through the system. Devices installed to specifications of the prior art require special mounting brackets, springs and insulators that are not readily available and are expensive to fabricate. Installation of an apparatus built to our specifications requires only common hardware store items such as 4" turnbuckles, 1½" nylon pulleys, Dare fence insulator No. 1728, small cable clamps, and 4" screw eye hooks.

Devices built to the teachings of the prior art have all required frequent replacement of expensive parts such as conductors and transformers. An advantage of our invention is that the apparatus uses low power, high reliable state-of-the art electronic component and contains no parts subject to stress and subsequent failure as in the apparatus of the prior art. An advantage of using less expensive, lower power, more reliable, and less stressed components also means less maintenance and repair cost and less down time than experienced with the devices disclosed in the prior art.

Another advantage of our invention is the low input power requirements and thus low cost of operation. The input power requirements to the state-of-the art electronics disclosed in this invention is less than 2 watts which gives an operating expense (at $0.08/KWH) of less than $1.50 per year.

Further objects and advantages of our invention will become apparent from a consideration of the drawings and ensuing discription.

DRAWING FIGURES

FIG. 1 is a block diagram illustrating a first embodiment of the invention.

FIGS. 2(a)-2(f) show voltage waveforms at points in the electronics of the first embodiment.

DESCRIPTION

Figure 1:
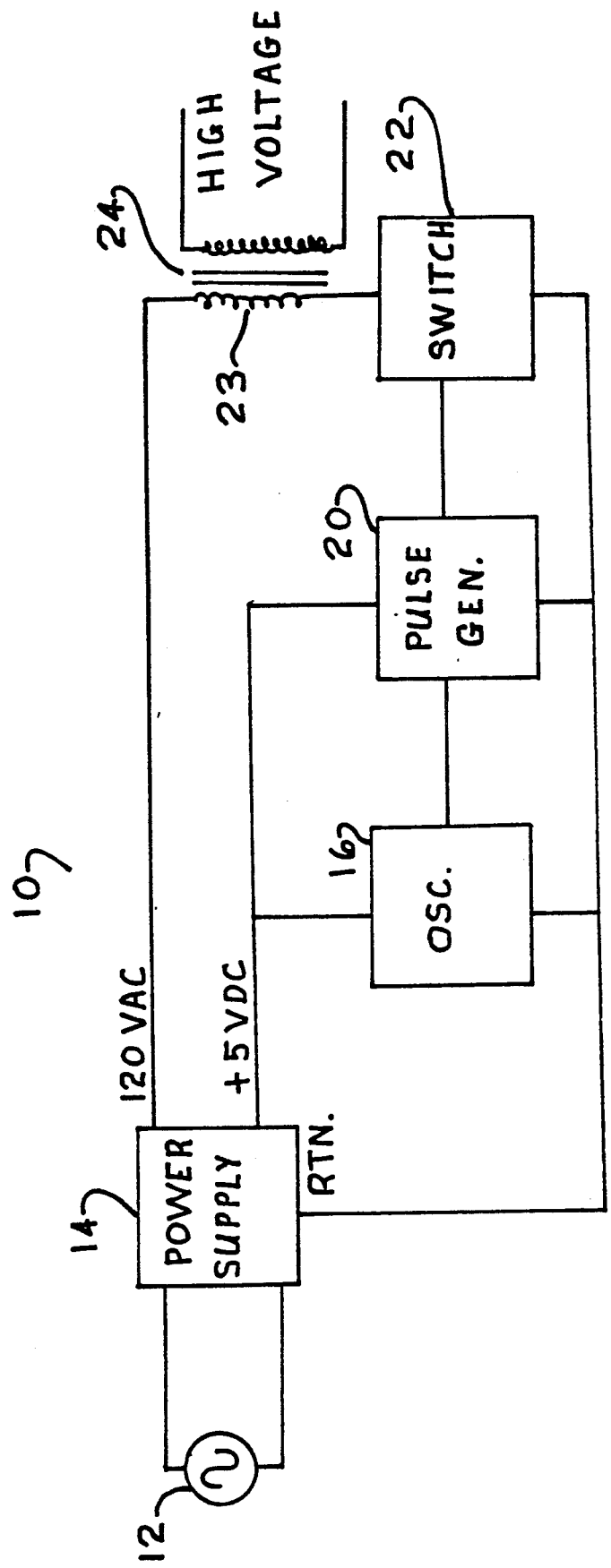

A typical embodiment of the electronics of the present invention is illustrated in FIG. 1. A circuit is provided which is connected to an AC power source 12, such as a house wall plug which supplies 115 volts at 60 Hz. While the invention is described and explained throughout this application which reference to an AC power source of 115 volts with a frequency of 60 Hz, it will be recognized that certain modifications and changes could be made in order to adapt this invention to operate with other sources such as 230 volts, 50 Hz or a DC power supply.

In FIG. 1, an electronic circuit 10 is connected to an AC power source 12 which supplies the AC electrical power. This AC power is rectified, filtered and the DC output voltage regulated by the power supply 14. The regulated DC voltage is used to power the oscillator 16 and the pulse generator 20. The pulse generator 20 circuit drives the thyristor switch 22 to control the current through the high voltage transformer 24.

The AC power source 12 also provides the power to the primary 23 of the high voltage transformer 24. The current through the primary 23 of the high voltage transformer 24 generates a high voltage across the secondary 25 of the transformer 24.

Figure 2A:
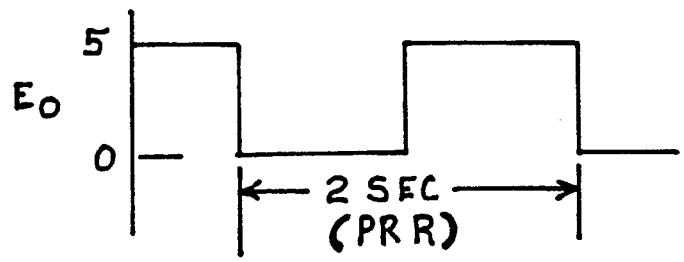

FIG. 2a is an illustration of the voltage out of the oscillator circuit 16. This oscillator is set to oscillate at 0.2 to 1 Hz. This establishes the output pulse repetition rate (prr) of the system.

Figure 2B:
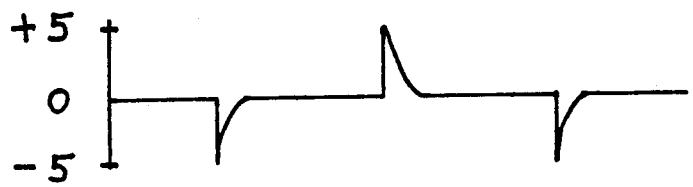
Figure 2C:
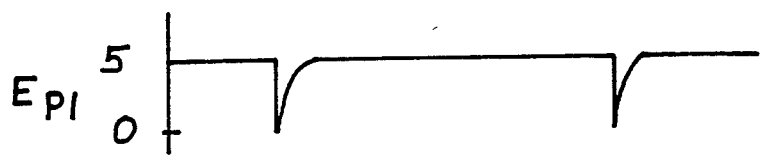
Figure 2D:
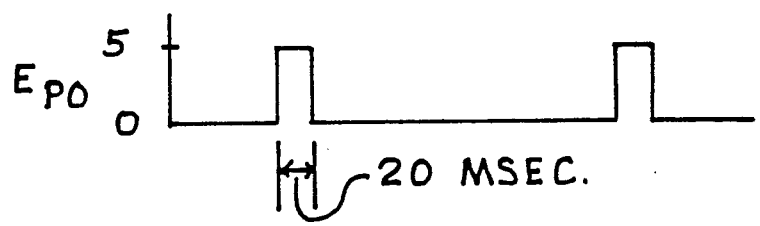
Figure 2E:
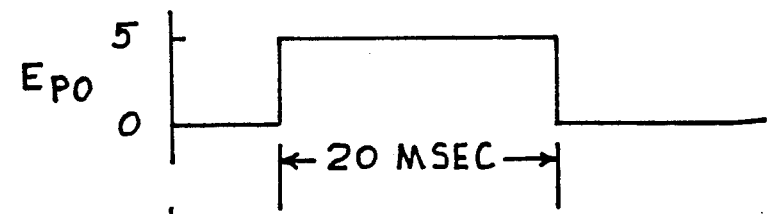

FIG. 2d is an illustration of the voltage out of the pulse generator circuit 20. The pulse width is set for 1 to 20 millisec. This is the time the thyristor switch 22 to turned on to allow current to flow through the high voltage transformer 24.

Figure 3:
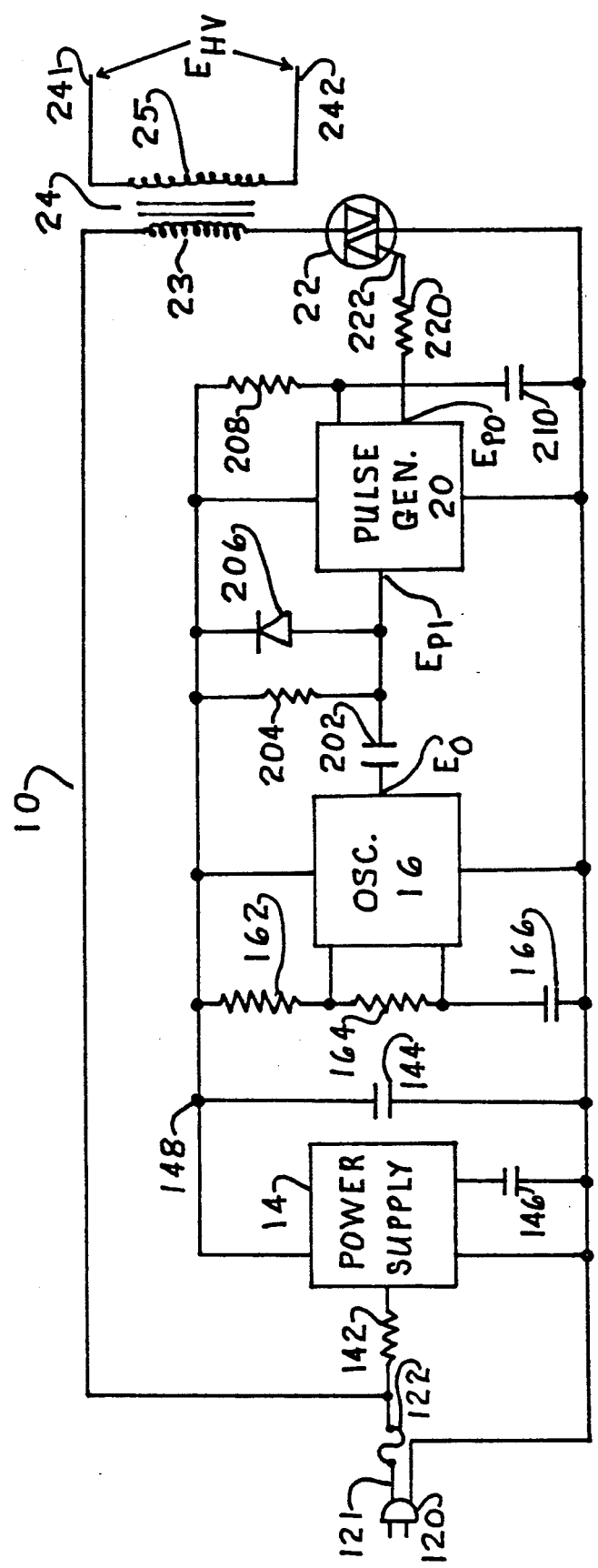
FIG. 3 is a schematic diagram further illustrating the invention and how it is configured.

FIG. 3 is a schematic illustration of the first embodiment of the invention. Referring to FIG. 1, the circuit 10 is connected to an AC power source 12. AC plug 120 is connected by cord 11 into an appliance outlet as is found in homes, barns, dairies, etc. Fuse 122 is connected in series with one side of the input power 12 to protect the system from over voltages and surges. Resistor 142 is a 220 ohm, 2 watt resistor used to limit the current to the power supply 14. Power supply 14 is a single IC chip type such as a Harris HV3-1205. Capacitors 144 and 146 are used in conjunction with power supply 14 to filter the rectified AC into a clean +5 VDC output 148. This +5 VDC is used to power the oscillator 16 and the pulse generator 20. Capacitor 144 is typically 100 uf, 16 v and capacitor 146 is typically 470 uf, 16 v.

Oscillator 16 is an integrated circuit type such as an NE555 from Motorola. The purpose of this oscillator is to set the basic pulse repetition rate of the output. Resistors 162 (10K) and 164 (51K) together with capacitor 166 (22 uf, 10 V) set the frequency of the oscillator. This frequency is typically set to 0.5 HZ to give a prr of one pulse out every two seconds. FIG. 2a is a representation of the output of the oscillator 16.

Capacitor 202 (0.1 uf) together with resistor 204 (51K) differentiates the output of oscillator 16 to produce the waveform shown in FIG. 2b at the input of the pulse generator 20. Diode 206 shunts the positive going spikes so only the negative going spikes initiate the pulse generator 20 output. The input to the pulse generator 20 is illustrated in FIG. 2c. Pulse generator 20 generates a 1 to 20 millisecond pulse as illustrated in FIG. 2d. Resistor 208 (100K) and capacitor 210 (0.1 uf) set the pulse width of the output of the pulse generator 20. Pulse generator 20 is an integrated circuit type such as a Motorola NE 555. Thyristor 22 is typically a Motorola triac such as a 2N6071. Resistor 220 (470 ohms) limits the current into the gate 222 of thyristor 22. When thyristor 22 is on, current can flow from one side of the AC input 12, through fuse 122, through the primary 23 of high voltage transformer 24, through the thyristor 22 to the other side of the AC input 12. While the thyristor 22 is in the on state, current will flow through the primary 23 of high voltage transformer 24. When ever current is flowing through the primary 23 of high voltage transformer 24, a high voltage is being generated in the secondary 25. This high voltage is then present between conductors 241 and 242, having an insulation rating of at least 10,000 V, and between high voltage wires 80 and 81.

Figure 2F:

FIG. 2c is an expanded illustration of the trigger pulse into the gate 222 of thyristor 22. FIG. 2f is a representation of the typical voltage across the secondary 25 of the high voltage transformer 24.

The high voltage transformer 24 has been custom designed for use in this system. A voltage of 120 VAC across the primary 23 will generate a 2 KVrms voltage across the secondary 25 when the secondary is loaded with a 100K resistor. The design for the size of the transformer takes into account the low duty cycle and therefore reduced average power requirements. The secondary 25 is totally isolated so there is no ground reference in the secondary 25.

Figure 4:
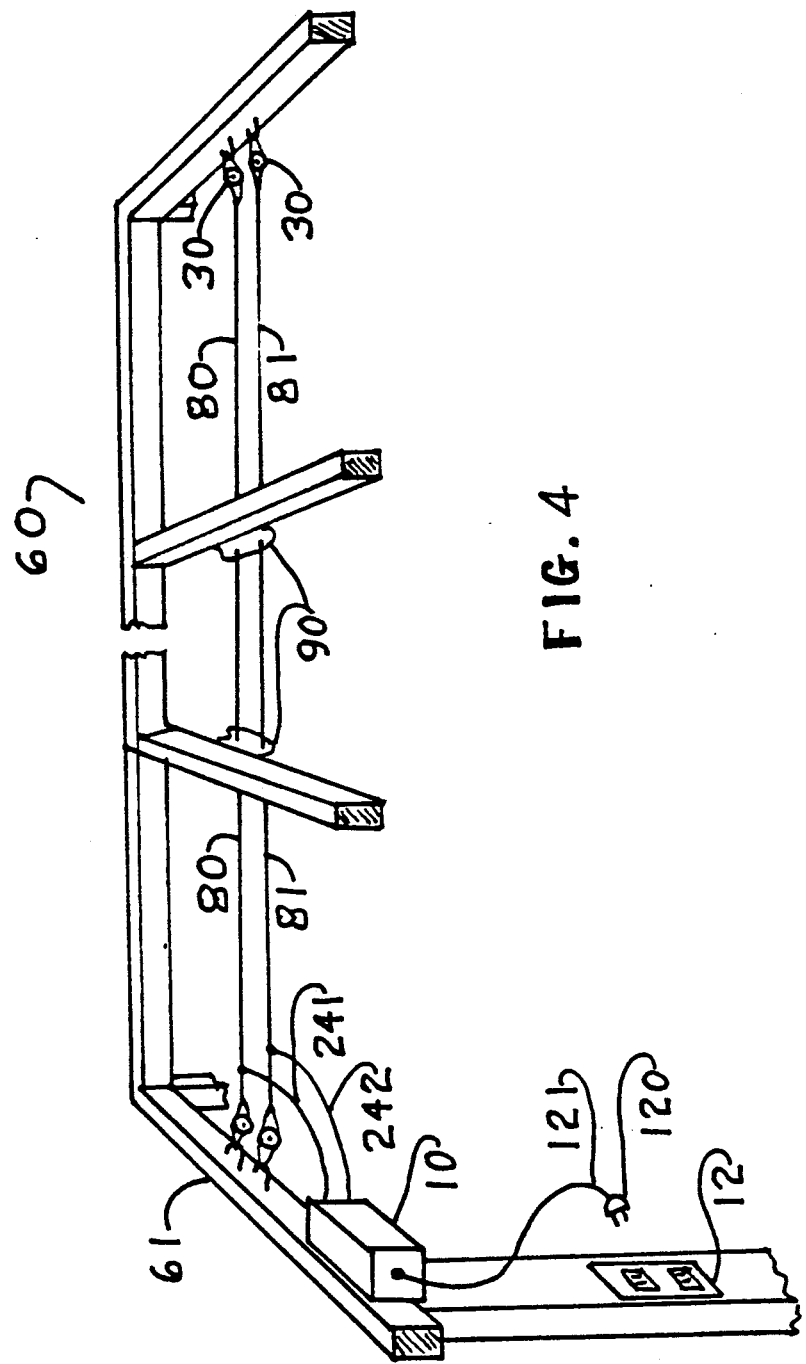
FIG. 4 is a perspective view showing the invention installed in a open rafter type poultry house.

FIG. 4 shows the invention as installed in an open rafter poultry building 60. The electronic unit 10 is plugged into an AC power source 12 with cord 121 and plug 120. The high voltage loads 241 and 242 from the electronic unit 10 are attached to the high voltage wires 80 and 81.

Figure 5:
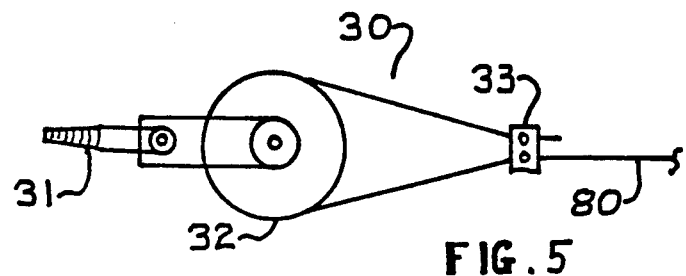
FIG. 5 is an enlarged view of the terminating end mounting apparatus for the conductors.
Figure 5A:
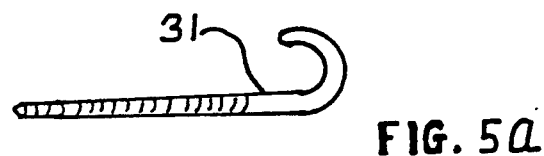
FIG. 5a shows the screw hook used in the first embodiment.
Figure 6:
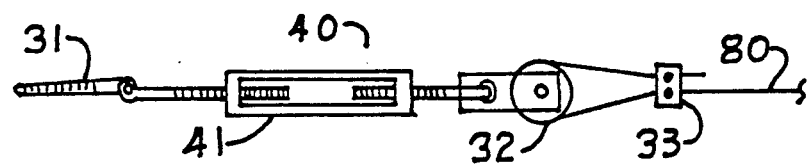
FIG. 6 is an enlarged view of a termination end conductor mounting apparatus that includes a turn buckle.

The conductors 80 and 81 are securely attached and drawn tight with the apparatus 30 and 40 shown in FIGS. 5 and 6. Two screw eye hooks FIG. 5a are screwed into the side of a rafter 61 about 6" apart at each end of the building 60. At one end the apparatus 40 as shown in FIG. 6 is assembled. The turnbuckle 41 and nylon pully 32 are attached to the screw eye hook 31. The conductor 80 is then run through the nylon pully 31 and held in place by cable clamp 33. This is repeated for the other conductor 81.

The apparatus 30 shown in FIG. 5 is then assembled at the other end of the building 670 and assembled in the same fashion as for apparatus 40 but without the turn buckle 41.

The conductors 80 and 81 are drawn tight by use of the turn buckle 41.

Figure 7:
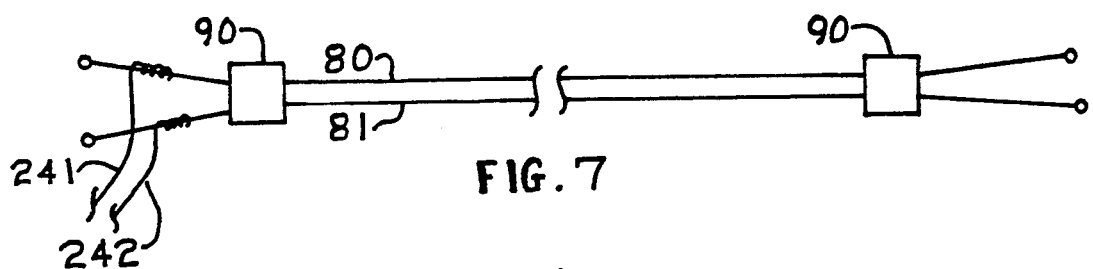
FIG. 7 is a planar view of the conductors mounted to the bottom of the rafters in a building.

The insulators/standoffs 90 are placed as needed on the bottom side of the rafters to hold the conductor 80 and 81 at the proper spacing. FIG. 7 is a simplified planar view of the bottom side of rafters showing the placement of the insulaters/stand offs.

Figure 8:
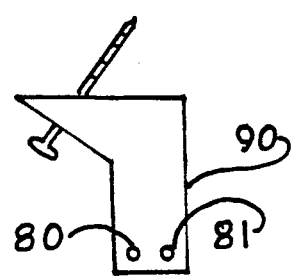
FIG. 8 is an enlarged cross section of the insulator/stand offs for the apparatus.

FIG. 8 is a cross sectional view showing the location of conducters 80 and 81 with relation to the insulator/standoff 90.

OPERATION

When the installation is complete, the electronic circuit 10 will have its input connected by means of cord 121 and plug 120 to an appliance outlet 12 which is the source of AC power for the system. The high voltage wires 241 and 242 from the electronics circuit 10 will be connected to the conductors 80 and 81. These conductors 80 and 81 will be energized by the electronics circuit 10 and will have a 6 KV peak-to-peak voltage pulse present between them for 20 milliseconds every 2 seconds.

SUMMARY, RAMIFICATIONS AND SCOPE

Thus a device is provided for controlling fly populations while at the same time providing a device which is safe for use around humans, safe for use in nearly any environment and which is inexpensive to produce, inexpensive to install, inexpensive to operate and which requires very low maintenance.

Accordingly, the reader will see that the apparatus of this invention can be used to control the population of flies within an animal or poultry shelter. In addition, the reader will see that the techniques and apparatus described in this invention are not only safe, effective and inexpensive but also represents a clearly marketable product.

Although the description above contains many specifications, these should not be construed as limiting the scope of the invention but merely providing illustrations of the presently preferred embodiments of this invention. For example, the pulse repetition rate oscillator and the pulse generator circuit can be of many forms such as a NE 555 or a NE 556 timer circuit, a PUT timer circuit and many other clock/timer circuits, etc. It is understood that the invention may be modified in many ways within the scope of the appended claims. In particular, it is to be understood that the invention is not limited to the specific embodiment wire configuration, electronic circuitry, pulse width and timing, or to the numerical values employed in describing this invention. Furthermore, many other types of components may be employed in practicing the invention in place of those which have been specifically described.

We claim:

1. A device for controlling the population of flies within a building by applying short duration high voltage bursts to destroy the nervous system of the files, said device comprising:
   (a) an electronic circuit means for generating high voltage bursts with sufficiently high voltage to destroy the nervous system of a fly, said bursts being of insufficient power to cause ignition of materials within the vicinity of said building, said circuit means having:
      a high-voltage transformer having a primary coil and a secondary coil;
      a triac switch connected to the primary coil;
      a pulse generator connected between said triac and an oscillator, for controlling said triac to turn on to allow current to flow through said transformer;
      an oscillator connected to said pulse generator, for controlling the pulse repetition rate of said pulse generator, and
   (b) roosting means connected to said secondary coil, providing a roosting surface for said flies, said roosting means having a pair of parallel conductors extending between two points within said building, said conductors being spaced ⅛ to 3/16 in. apart and neither of which conductors being rounded to any point of said building;
   whereby when a power source is applied to said circuit means, said pulse generator has a pulse width of 1-20 milliseconds, and said oscillator has a frequency of 0.2-1 Hz, thereby conduction of current flowing through said triac is limited to occur once every 1-5 seconds, and therefore a high voltage is being generated in the secondary coil and presented between said conductors only in short burst simultaneously.

2. The device as defined in claim 1 wherein said high-voltage transformer having an output of approximately 6,000 V peak-to-peak.

3. The device as defined in claim 1 further comprising a pair of insulated wire with insulation rating of at least 10,000 V connected between said roosting means and said secondary coil, for delivering said high voltage bursts to said rooting means.

4. The device as defined in claim 1 wherein said pair of conductors comprising a pair of wire having a diameter of 1/16 in.

* * * * *